United States Patent
Fujimoto et al.

(10) Patent No.: US 11,667,298 B2
(45) Date of Patent: Jun. 6, 2023

(54) DRIVER POSTURE MEASUREMENT DEVICE AND VEHICLE CONTROL DEVICE

(71) Applicant: Mitsubishi Electric Corporation, Tokyo (JP)

(72) Inventors: Tatsuo Fujimoto, Tokyo (JP); Nobuyoshi Tomomatsu, Tokyo (JP); Taiga Tanaka, Tokyo (JP); Tatsuji Irie, Tokyo (JP); Wataru Tsujita, Tokyo (JP); Junji Hori, Tokyo (JP); Kenzo Makino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 57 days.

(21) Appl. No.: 17/504,112

(22) Filed: Oct. 18, 2021

(65) Prior Publication Data

US 2022/0161804 A1    May 26, 2022

(30) Foreign Application Priority Data

Nov. 26, 2020   (JP) .............................. JP2020-195673

(51) Int. Cl.
| | |
|---|---|
| *B60W 40/08* | (2012.01) |
| *G06F 3/01* | (2006.01) |
| *B60W 40/11* | (2012.01) |
| *B60W 50/14* | (2020.01) |
| *B60W 30/08* | (2012.01) |
| *G01S 13/44* | (2006.01) |
| *H04W 4/40* | (2018.01) |

(52) U.S. Cl.
CPC ............ *B60W 40/08* (2013.01); *B60W 30/08* (2013.01); *B60W 40/11* (2013.01); *B60W 50/14* (2013.01); *G01S 13/44* (2013.01); *G06F 3/012* (2013.01); *H04W 4/40* (2018.02); *B60W 2050/146* (2013.01); *B60W 2300/36* (2013.01); *B60W 2520/16* (2013.01); *B60W 2540/223* (2020.02); *B60W 2710/0627* (2013.01); *B60W 2710/0633* (2013.01); *B60W 2710/0666* (2013.01)

(58) Field of Classification Search
CPC ........................ B60W 40/08; B60W 2540/223
See application file for complete search history.

(56) References Cited

U.S. PATENT DOCUMENTS

2023/0008012 A1\*   1/2023  Igari ..................... B60W 50/14

FOREIGN PATENT DOCUMENTS

| JP | 2017-178284 A  | 10/2017 |
|---|---|---|
| JP | 2017178284 A  \* | 10/2017 |

\* cited by examiner

*Primary Examiner* — Benyam Haile
(74) *Attorney, Agent, or Firm* — Sughrue Mion, PLLC; Richard C. Turner

(57) ABSTRACT

Provided are a driver posture measurement device and a vehicle control device that can accurately measure the posture of a driver with a simple configuration without attaching a plurality of wireless communication units to a vehicle. The driver posture measurement device and the vehicle control device are configured such that, between one wireless communication unit provided on the vehicle side and one wireless communication unit provided on the driver side, radio waves are radiated from the wireless communication unit provided on the vehicle side, and on the basis of a radio wave arrival angle of the radio waves arriving at the wireless communication unit provided on the driver side, the driver posture is measured.

15 Claims, 17 Drawing Sheets

DRIVER POSTURE MEASUREMENT DEVICE AND VEHICLE CONTROL DEVICE

BACKGROUND OF THE INVENTION

1. Field of the Invention

The present disclosure relates to a driver posture measurement device and a vehicle control device.

2. Description of the Background Art

As a device for detecting the riding posture of a driver on a saddle-type vehicle such as a motorcycle, there is known a device that includes wireless communication units provided at least at three different positions on the vehicle side, and at least one body position sensor provided on the driver side and being communicable with the wireless communication units, thus measuring the riding posture of the driver (see, for example, Patent Document 1).

Patent Document 1: Japanese Laid-Open Patent Publication No. 2017-178284

In general, many of saddle-type vehicles such as motorcycles are highly adapted to hobbies and preferences, e.g., for leisure or sports, and the design of the vehicle body is considered to be important. Therefore, the layout of the vehicle body is constrained and a simple device that does not influence the design of the vehicle body is desired. In addition, since motorcycles are generally inexpensive as compared to automobiles, the device is desired to have a low-cost configuration. Under the constraint on the layout of the vehicle body, it is difficult to realize attachment of the plurality of wireless communication units to the vehicle as in Patent Document 1, and also in terms of vehicle cost, such attachment of the plurality of wireless communication units leads to increase in cost.

SUMMARY OF THE INVENTION

The present disclosure has been made to solve the above problem, and an object of the present disclosure is to provide a simplified driver posture measurement device and a simplified vehicle control device using the posture of a driver, with a decreased number of wireless communication units provided.

A driver posture measurement device according to the present disclosure includes: one first wireless communication unit attached directly or indirectly to a head of a driver; one second wireless communication unit provided to a vehicle; a radio wave arrival angle detection unit which detects, for the second wireless communication unit, a radio wave arrival angle from the first wireless communication unit; and a driver posture detection unit which determines a driving posture of the driver on the basis of the radio wave arrival angle.

In the driver posture measurement device according to one aspect of the present disclosure, the posture of the driver is detected using radio wave propagation between one wireless communication unit provided on the driver side and one wireless communication unit provided on the vehicle side. Thus, the number of provided wireless communication units can be decreased.

DETAILED DESCRIPTION OF THE PREFERRED EMBODIMENTS OF THE INVENTION

Figure 1:
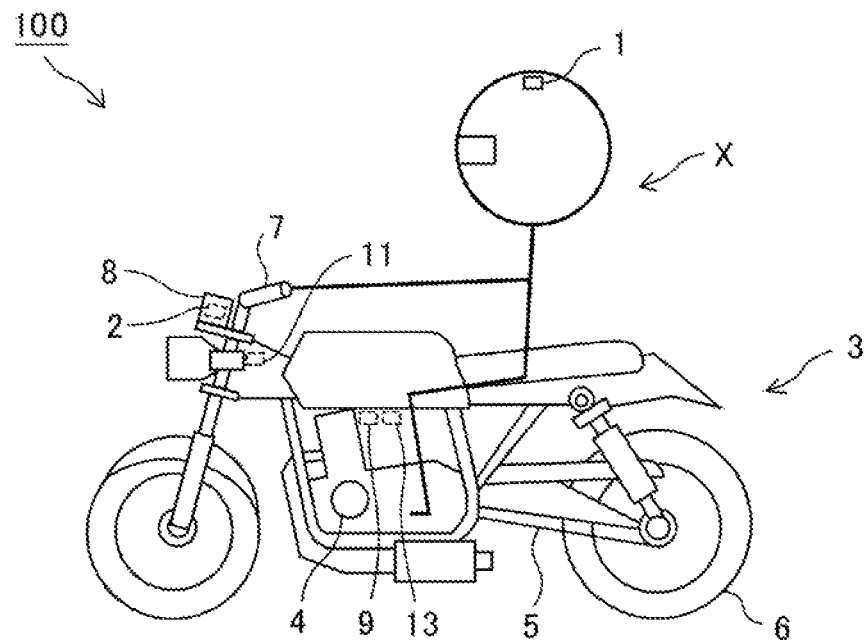
FIG. 1 is a left side view of a vehicle on which a driver posture measurement device according to the first embodiment of the present disclosure is mounted.

Hereinafter, preferred embodiments will be described in detail with reference to the drawings. The same or corresponding contents and parts are denoted by the same reference characters, and the detailed description is omitted. Also in the subsequent embodiments, parts denoted by the same reference characters will not be repeatedly described.

First Embodiment

<Schematic Configuration of Driver Posture Measurement Device 100>

FIG. 1 is a left side view of a motorcycle (hereinafter, referred to as vehicle) 3 to which a driver posture measurement device 100 according to the present embodiment of the present disclosure is applied. The vehicle 3 is a saddle-type vehicle which travels while transmitting motive power generated by an engine 4 as a motive power source to a rear wheel 6 via a drive chain 5.

A meter device 8 for indicating information such as the speed and the distance is provided near a steering handlebar 7. The vehicle 3 is provided with a gyro sensor 9 capable of detecting a roll angle, a pitch angle, a yaw angle, and the like of the vehicle, and a tilt angle sensor 13 for detecting the tilt of the vehicle 3.

Figure 2:
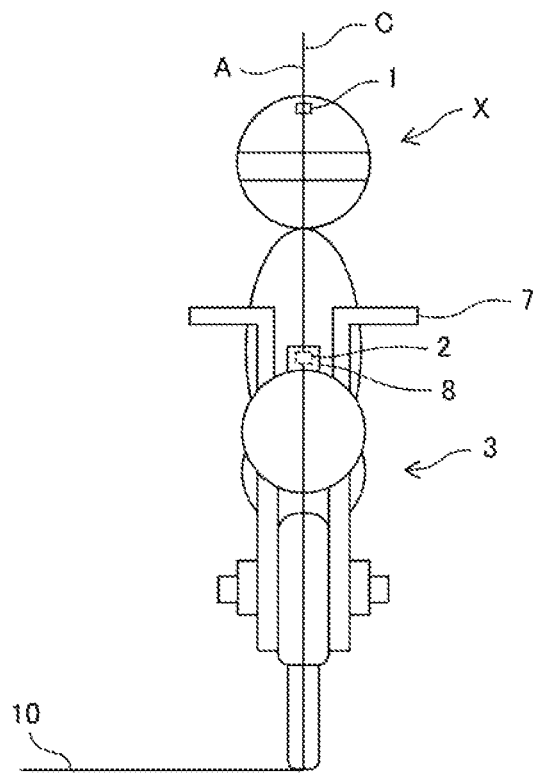
FIG. 2 is a front view of the vehicle on which the driver posture measurement device according to the first embodiment is mounted.

FIG. 2 is a front view of the vehicle 3 on which a driver X is riding. The driver posture measurement device 100 has a vehicle coordinate system with the vehicle 3 as a reference. The left-right direction in the vehicle coordinate system coincides with the left-right direction with respect to a vehicle vertical line A perpendicular to a horizontal road surface 10. When the vehicle 3 is banked in turning traveling of the vehicle 3, the vehicle vertical line A is also tilted to the left or right in the same manner. Regarding the driver posture measured in the vehicle coordinate system, driver posture determination is performed by combining, with the tilt of the vehicle 3, a radio wave arrival angle and a radio wave intensity between a wireless communication unit 1 and a wireless communication unit 2 described later.

In the present embodiment, the wireless communication unit 2 is provided inside the meter device 8 of the vehicle 3. However, the wireless communication unit 2 may be provided around an instrument panel near the meter, or under the seat. The wireless communication unit 1 is attached directly or indirectly to the head of the driver. For example, the wireless communication unit 1 is provided to a helmet worn by the driver X. Specifically, the wireless communication unit 1 is provided on, of the helmet, a surface in a head up-down direction passing the head top and the forehead of the driver X. Separately from the wireless communication unit 1 and the wireless communication unit 2, antennas described in the second and subsequent embodiments are provided.

A control device 11 of the driver posture measurement device 100 is provided below the meter device 8. The control device 11 may be provided integrally with an electronic control unit (ECU) 12 for controlling the engine 4 and the like.

<Configuration and Operation of Control Device 11 of Driver Posture Measurement Device 100>

Figure 3:
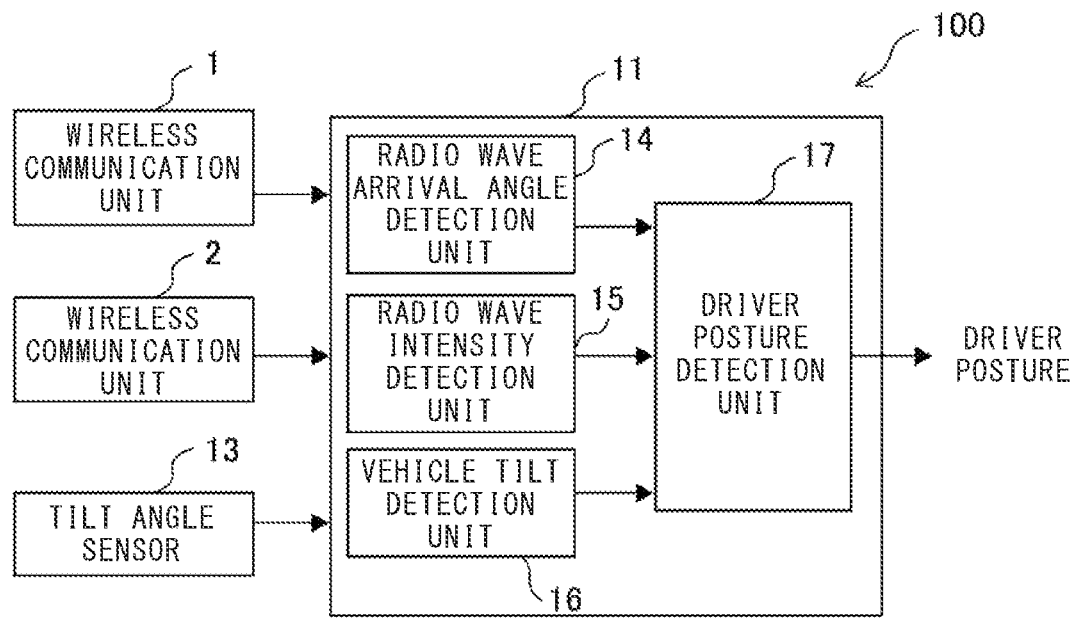
FIG. 3 is a function block diagram of the driver posture measurement device according to the first embodiment.

FIG. 3 is a function block diagram of the driver posture measurement device 100. The control device 11 receives an output of the wireless communication unit 1, an output of the wireless communication unit 2, and an output of the tilt angle sensor 13. From the output of the wireless communication unit 1 and the output of the wireless communication unit 2, a radio wave arrival angle detection unit 14 in the control device 11 detects the radio wave arrival angle, and a radio wave intensity detection unit 15 detects the radio wave intensity. In addition, from the output of the tilt angle sensor 13, a vehicle tilt detection unit 16 in the control device 11 detects a vehicle tilt. It is noted that the vehicle tilt may be calculated using the gyro sensor 9. The radio wave arrival angle, the radio wave intensity, and the vehicle tilt are inputted to a driver posture detection unit 17 in the control device 11, whereby a driver posture is calculated. On the basis of the driver posture detected by the driver posture detection unit 17, a drive output of a motive power source of the vehicle 3 is controlled as described later.

Figure 4:
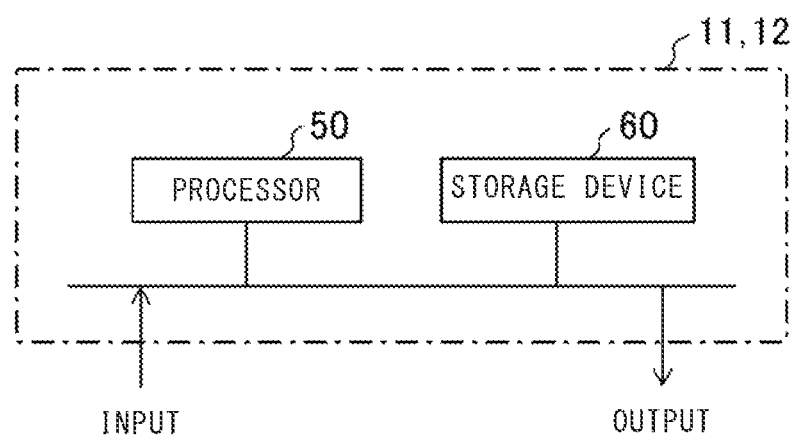
FIG. 4 is a diagram showing an example of hardware of a control device and an ECU according to embodiments.

FIG. 4 shows an example of hardware of the control device 11 and the ECU 12. The hardware is composed of a processor 50 and a storage device 60, and the storage device 60 includes a volatile storage device such as a random access memory and a nonvolatile auxiliary storage device such as a flash memory, although not shown. Instead of the flash memory, an auxiliary storage device of a hard disk may be provided. The processor 50 executes a program inputted from the storage device 60, thereby performing operation according to a flowchart described later. In this case, the program is inputted from the auxiliary storage device to the processor 50 via the volatile storage device. The processor 50 may output data such as a calculation result to the volatile storage device of the storage device 60, or may store such data into the auxiliary storage device via the volatile storage device. It is noted that control devices 11a to 11c and an ECU 12c described in the second to fourth embodiments also have the same configuration.

<Detailed Description of Driver Riding Posture Detection>

Figure 5:
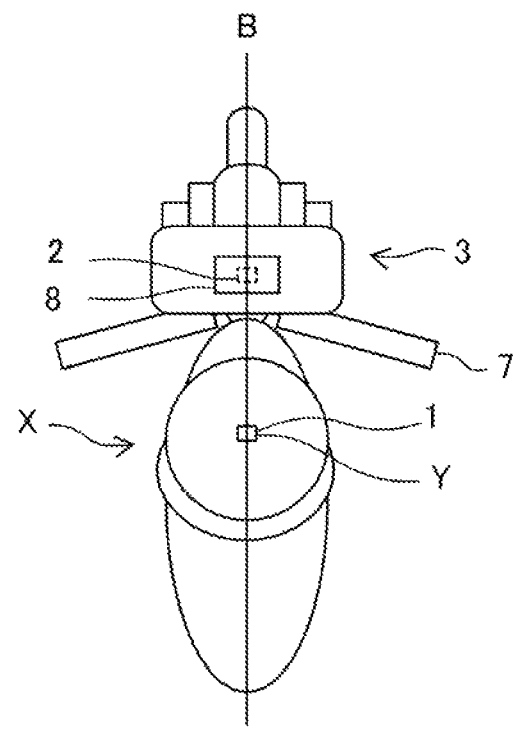
FIG. 5 is a top view illustrating the riding posture of a driver according to the first embodiment.

With the configuration of the driver posture measurement device 100 as described above, the wireless communication unit 2 on the vehicle side is configured to detect a head position Y of the wireless communication unit 1 attached to the driver X. That is, on the basis of the radio wave arrival angle and the radio wave intensity of a signal emitted from the wireless communication unit 1 on the driver X side to the wireless communication unit 2 on the vehicle side, the position in the left-right direction of the head of the driver X and also the distance in the front-rear direction thereof are detected. As shown in FIG. 5, the head position Y is located on a vehicle center line B passing the center of the vehicle 3, in a normal riding posture.

Figure 6:
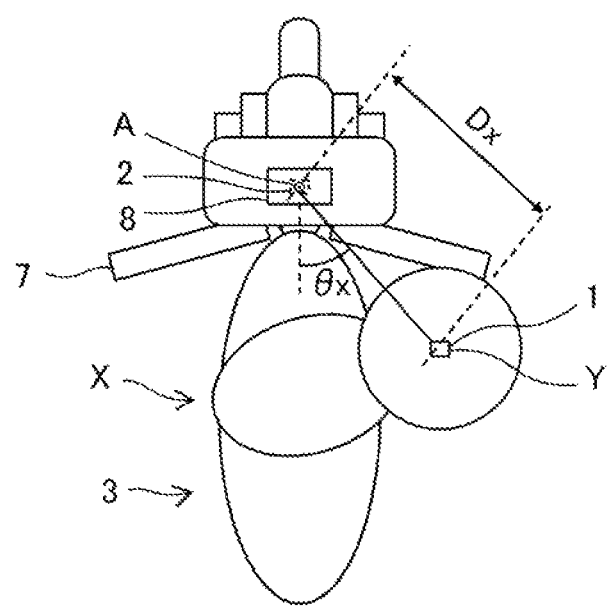
FIG. 6 is a top view illustrating the riding posture of the driver according to the first embodiment.

As shown in FIG. 6, a radio wave arrival angle θx in the left-right direction of the head of the driver X and a radio wave intensity Dx in the front-rear direction of the head are detected from the detected head position Y. The radio wave arrival angle θx indicates to what extent the head position Y is tilted, using, as a reference, the vehicle vertical line A passing the wireless communication unit 2. The radio wave intensity Dx indicates to what extent the head position Y is away, using the wireless communication unit 2 as a reference.

Next, a method for measuring the riding posture using the driver posture measurement device 100 will be described. First, type discrimination among a lean-with posture, a lean-in posture, a lean-out posture, and a hanging-off posture will be described.

Figure 7:
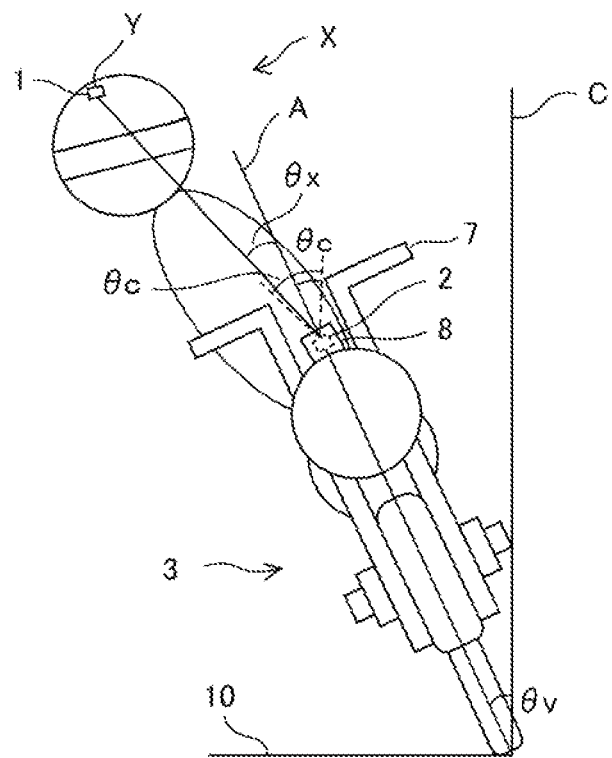
FIG. 7 is a front view illustrating the riding posture of the driver according to the first embodiment.
Figure 8:
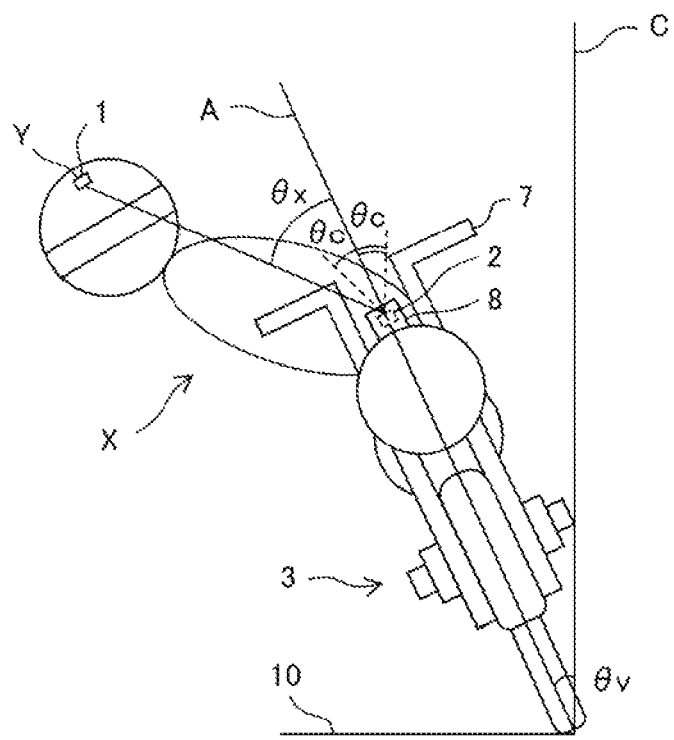
FIG. 8 is a front view illustrating the riding posture of the driver according to the first embodiment.
Figure 9:
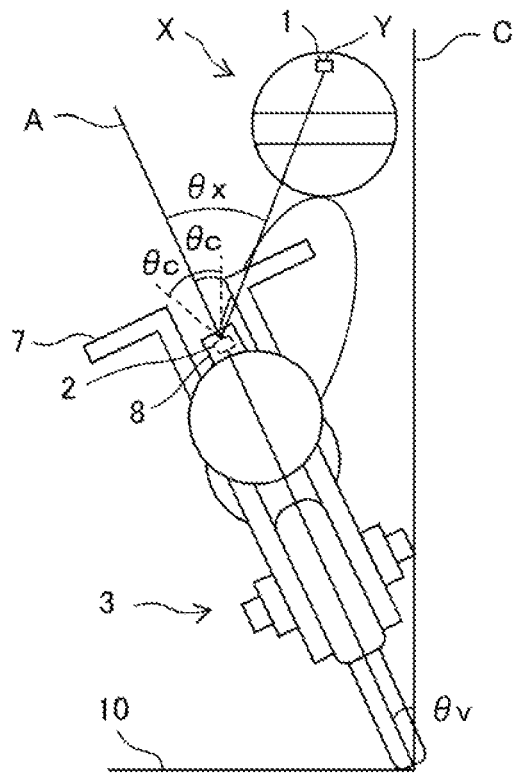
FIG. 9 is a front view illustrating the riding posture of the driver according to the first embodiment.
Figure 10:
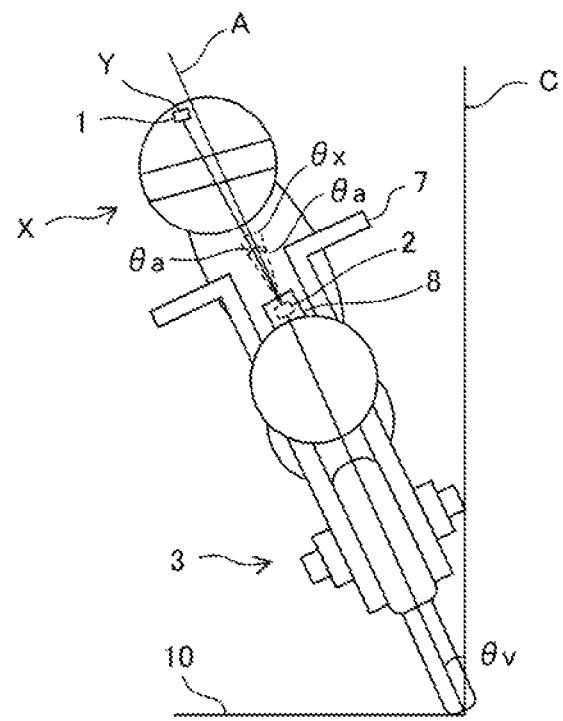
FIG. 10 is a front view illustrating the riding posture of the driver according to the first embodiment.

FIG. 7 is a front view of the vehicle 3 when the driver X is in the lean-with posture. FIG. 8 is a front view of the vehicle 3 in the lean-in posture, FIG. 9 is a front view of the vehicle 3 in the lean-out posture, and FIG. 10 is a front view of the vehicle 3 in the hanging-off posture. In any of the cases, a vehicle tilt (vehicle roll angle to the ground) $\theta v$ is the same.

Regarding type detection for the lean-with posture, the lean-in posture, and the lean-out posture, they can be determined from the head position Y with respect to the vehicle vertical line A in the vehicle coordinate system. As shown in FIG. 7, if the radio wave arrival angle away from the vehicle vertical line A toward the left/right in the vehicle-width direction is not greater than a threshold $\theta c$ (e.g., 30 degrees), the posture is determined to be the lean-with posture. As shown in FIG. 8, if the radio wave arrival angle is away beyond the threshold $\theta c$ toward the turning-direction side, the posture is determined to be the lean-in posture. As shown in FIG. 9, if the radio wave arrival angle is away beyond the threshold $\theta c$ toward the side (outer side) opposite to the turning-direction side, the posture is determined to be the lean-out posture.

Regarding hanging-off posture detection, determination can be performed on the basis of the head position Y with respect to the vehicle vertical line A in the vehicle coordinate system and the vehicle tilt with respect to a road surface vertical line C perpendicular to the horizontal road surface 10. In the present embodiment, as shown in FIG. 10, if the radio wave arrival angle away from the vehicle vertical line A toward the left/right in the vehicle-width direction is not greater than a threshold $\theta a$ (e.g., 10 degrees) and the vehicle tilt away from the road surface vertical line C toward the left/right in the vehicle-width direction exceeds a threshold $\theta b$ (e.g., 40 degrees), the posture is determined to be the hanging-off posture.

Figure 11:
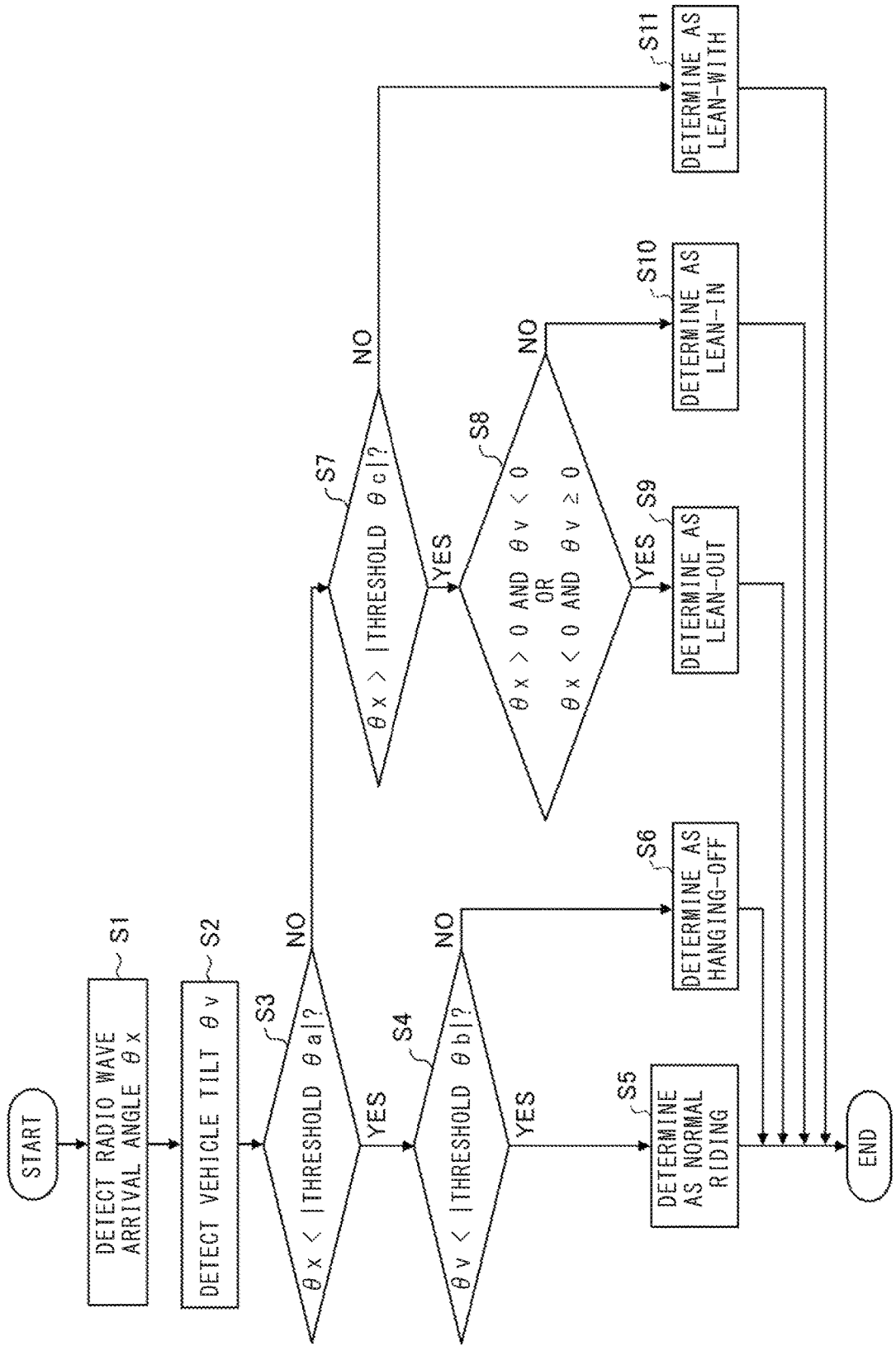
FIG. 11 is a flowchart illustrating operation for determining the vehicle posture according to the first embodiment.

FIG. 11 is a flowchart illustrating operation for determining the vehicle posture in the control device 11. This control is performed in the driver posture detection unit 17.

In step S1, the radio wave arrival angle $\theta x$ is detected on the basis of the head position Y.

The radio wave arrival angle $\theta x$ is calculated using the frequency, the amplitude, and the phase of the received signal. Specifically, technology used in radar or the like may be applied, e.g., monopulse angle measurement, a MUSIC method, maximum likelihood estimation, or the like may be used. As the wireless communication unit 1 and the wireless communication unit 2, a device having a ranging function and an angle measurement function in addition to a communication function can be used, and specifically, a Bluetooth communication unit or a UWB communication unit may be used.

In step S2, the vehicle tilt (vehicle roll angle to the ground) $\theta v$ is detected on the basis of the tilt angle sensor 13. Alternatively, the vehicle tilt (vehicle roll angle to the ground) $\theta v$ may be calculated using the gyro sensor 9. In step S3, whether or not the radio wave arrival angle $\theta x$ is smaller than the absolute value of the threshold $\theta a$, is determined. If the determination result is YES in step S3, the process proceeds to step S4.

In step S4, whether or not the vehicle tilt (vehicle roll angle to the ground) $\theta v$ is smaller than the absolute value of the threshold $\theta b$, is determined. If the determination result is YES in step S4, the process proceeds to step S5, so that the posture is determined to be the normal riding posture. On the other hand, if the determination result is NO in step S4, the process proceeds to step S6, so that the posture is determined to be the hanging-off posture.

If the determination result is NO in step S3, the process proceeds to step S7, to determine whether or not the radio wave arrival angle $\theta x$ is greater than the absolute value of the threshold $\theta c$. If the determination result is YES in step S7, the process proceeds to step S8.

In step S8, whether or not radio wave arrival angle $\theta x<0$ and vehicle tilt $\theta v \geq 0$, or radio wave arrival angle $\theta x>0$ and vehicle tilt $\theta v<0$, are satisfied, is determined. If the determination result is YES in step S8, the process proceeds to step S9, so that the posture is determined to be the lean-out posture. On the other hand, if the determination result is NO in step S8, the process proceeds to step S10, so that the posture is determined to be the lean-in posture.

If the determination result is NO in step S7, the process proceeds to step S11, so that the posture is determined to be the lean-with posture.

Next, type detection for a forward-leaning posture, a rearward-leaning posture, or a standing posture will be described.

Figure 12:
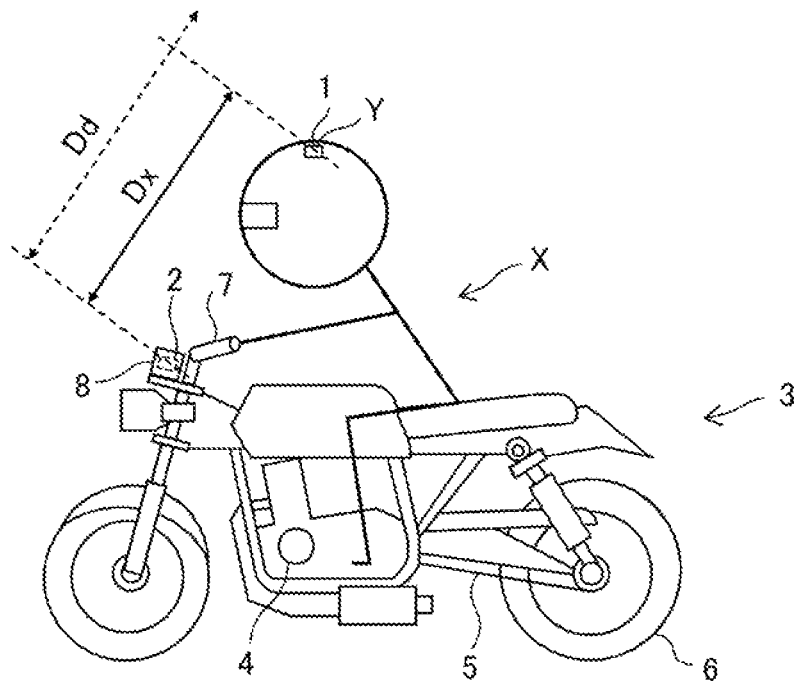
FIG. 12 is a left side view illustrating the riding posture of the driver according to the first embodiment.

FIG. 12 is a left side view of the vehicle 3 when the driver X is in the forward-leaning posture. In the forward-leaning posture, the head position Y is moved to the front side of the vehicle relative to the normal riding state.

Figure 13:
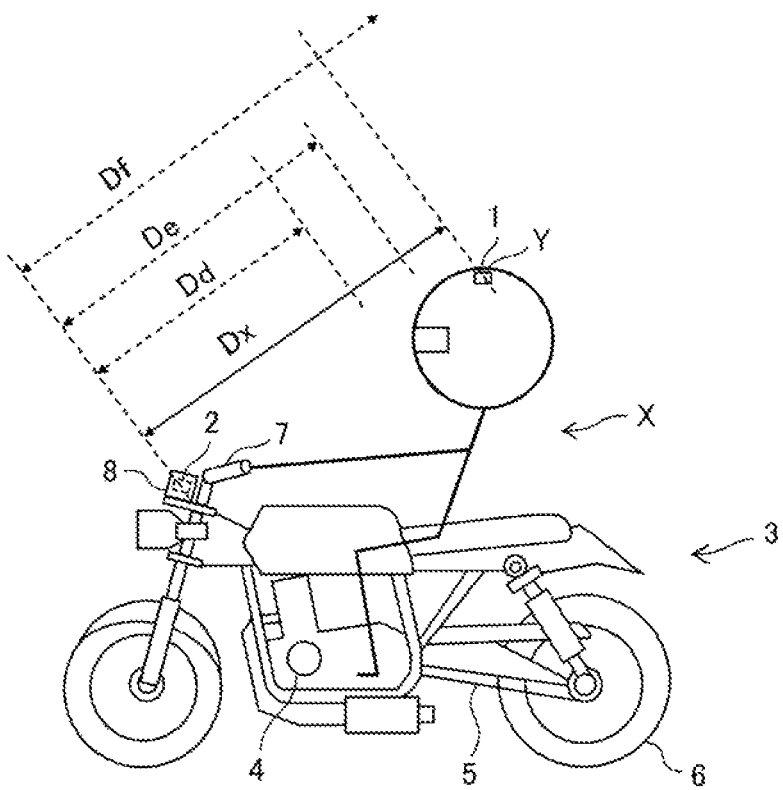
FIG. 13 is a left side view illustrating the riding posture of the driver according to the first embodiment.

FIG. 13 is a left side view of the vehicle 3 showing a rearward-leaning state. In the rearward-leaning posture, the head position Y is moved to the rear side of the vehicle relative to the normal riding state.

Figure 14:
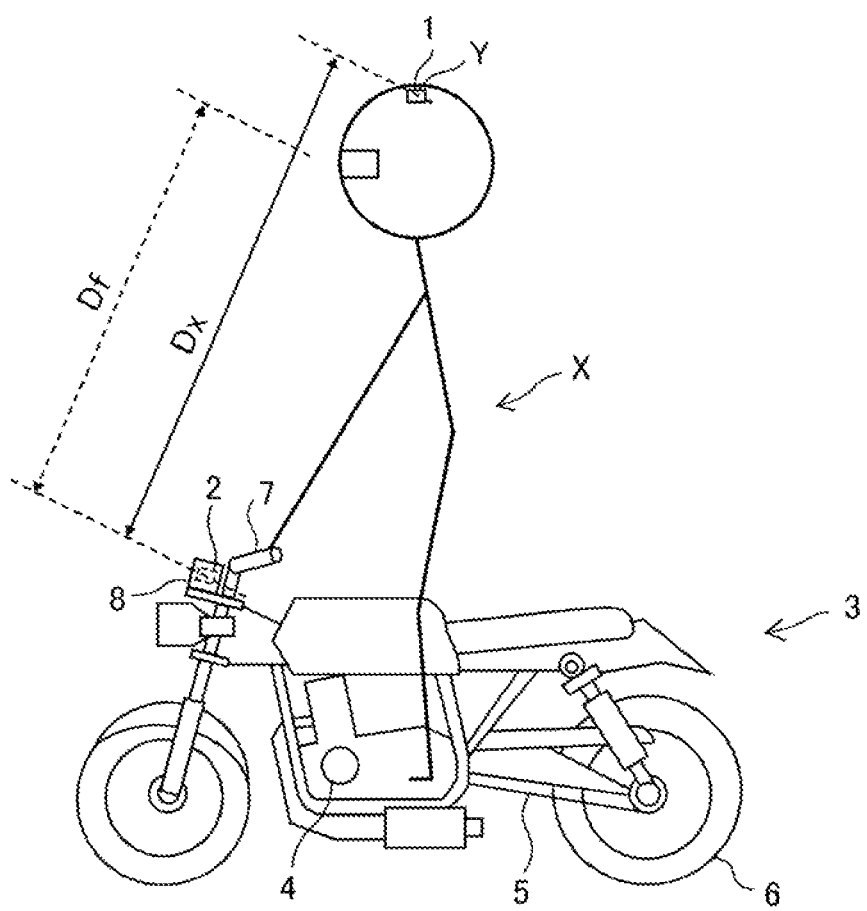
FIG. 14 is a left side view illustrating the riding posture of the driver according to the first embodiment.

FIG. 14 is a left side view of the vehicle 3 showing a standing state. In the standing posture, the head position Y is moved upward of the vehicle relative to the normal riding state.

Thus, regarding detection for the forward-leaning posture, the rearward-leaning posture, and the standing posture, the posture can be determined from the head position Y with respect to the wireless communication unit 2. That is, in the present embodiment, as shown in FIG. 12, if the radio wave intensity from the wireless communication unit 2 is not greater than a threshold Dd (for example, 20 dbm), the posture is determined to be the forward-leaning posture. As shown in FIG. 13, if the radio wave intensity exceeds the threshold Dd and is not greater than a threshold De (e.g., 30 dbm), the posture is determined to be the normal riding posture, and if the radio wave intensity exceeds the threshold De and is not greater than a threshold Df (e.g., 50 dbm), the posture is determined to be the rearward-leaning posture. As shown in FIG. 14, if the radio wave intensity exceeds the threshold Df, the posture is determined to be the standing posture. The threshold Df of the radio wave intensity for the standing posture may be set on the basis of the body height of the driver X inputted in advance, whereby the driver X may be determined to be in the standing posture.

Figure 15:
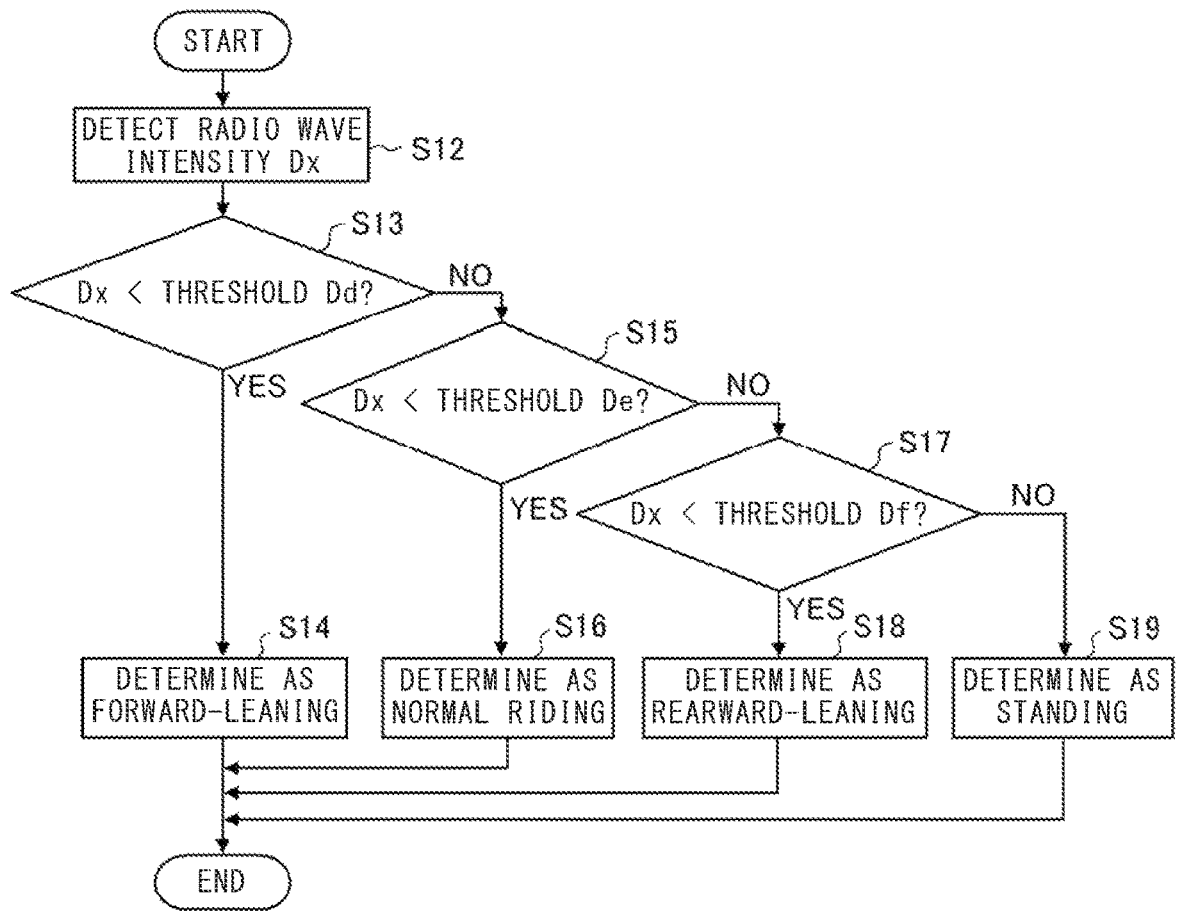
FIG. 15 is a flowchart illustrating operation for determining the vehicle posture according to the first embodiment.

FIG. 15 is a flowchart showing a procedure of control for measuring the forward-leaning posture, the rearward-leaning posture, and the standing posture. This control is performed in the driver posture detection unit 17. In step S12, the radio wave intensity Dx is detected on the basis of the head position Y. In step S13, whether or not the radio wave intensity Dx is smaller than the threshold Dd is determined. If the determination result is YES in step S13, the process proceeds to step S14, so that the posture is determined to be the forward-leaning posture.

If the determination result is NO in step S13, the process proceeds to step S15, to determine whether or not the radio wave intensity Dx is smaller than the threshold De. If the determination result is YES in step S15, the process proceeds to step S16, so that the posture is determined to be the normal riding posture.

If the determination result is NO in step S15, the process proceeds to step S17, to determine whether or not the radio wave intensity Dx is smaller than the threshold Df. If the determination result is YES in step S17, the process proceeds to step S18, so that the posture is determined to be the rearward-leaning posture.

If the determination result is NO in step S17, the process proceeds to step S19, so that the posture is determined to be the standing posture.

<Control for Motive Power Source of Vehicle Using Driver Posture Measurement Device 100>

Hereinafter, a drive output of the motive power source of the vehicle will be described on the basis of the posture of the driver X detected by the driver posture detection unit 17 as described above. Also in the second to fourth embodiments, the motive power source control can be performed in the same manner. First, a case where the motive power source is the engine 4 will be described.

Figure 16:
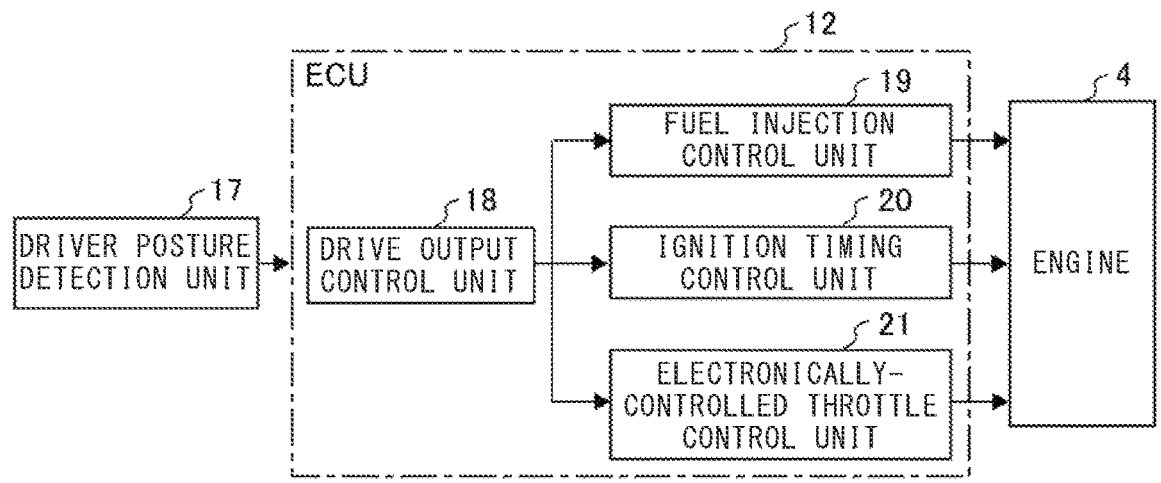
FIG. 16 is a function block diagram illustrating a drive output of a motive power source of the vehicle on the basis of the driver posture detected by a driver posture detection unit according to the first embodiment.

FIG. 16 is a function block diagram showing a configuration in which the output of the driver posture detection unit 17 in the control device 11 described in FIG. 3 is converted to an output command by the ECU 12 so as to be transmitted to the engine 4. The ECU 12 includes a drive output control unit 18, a fuel injection control unit 19, an ignition timing control unit 20, and an electronically-controlled throttle control unit 21, and controls the output command for the engine 4.

On the basis of the driver posture from the driver posture detection unit 17, the drive output control unit 18 outputs a drive output control command to the fuel injection control unit 19, the ignition timing control unit 20, and the electronically-controlled throttle control unit 21.

When the drive output control command is inputted from the drive output control unit 18, the fuel injection control unit 19 changes a fuel injection amount and a fuel injection timing of a fuel injection device (not shown). When the drive output control command is inputted, the ignition timing control unit 20 changes an ignition timing. When the drive output control command is inputted, the electronically-controlled throttle control unit 21 controls an air amount regulating valve of an electronically-controlled throttle (not shown), to change an intake air amount.

As described above, when the drive output control command is outputted from the drive output control unit 18, one of or two or more of the fuel injection control unit 19, the ignition timing control unit 20, and the electronically-controlled throttle control unit 21 are used in combination to change the output of the engine 4, whereby torque generated by the internal combustion engine is controlled and the vehicle 3 is controlled.

Figure 17:
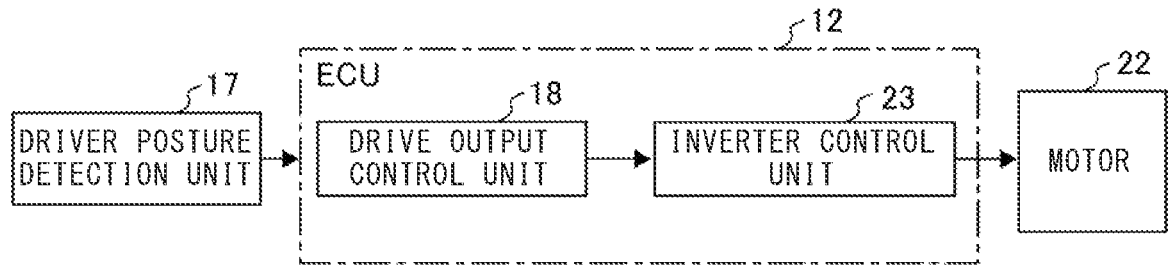
FIG. 17 is a function block diagram illustrating a drive output of a motive power source of the vehicle on the basis of the driver posture detected by the driver posture detection unit according to the first embodiment.

Next, a case where the motive power source is a motor 22 will be described. FIG. 17 is a function configuration diagram showing a configuration in which the output of the driver posture detection unit 17 in the control device 11 described in FIG. 3 is converted to an output command for the motor 22 by the ECU 12 so as to be transmitted to the motor 22. The ECU 12 includes the drive output control unit 18 and an inverter control unit 23.

On the basis of the driver posture from the driver posture detection unit 17, the drive output control unit 18 outputs a drive output control command to the inverter control unit 23.

When the drive output control command is inputted, the inverter control unit 23 controls an output of an inverter (not shown) to change output torque of the motor 22, thus controlling the vehicle.

Figure 18:
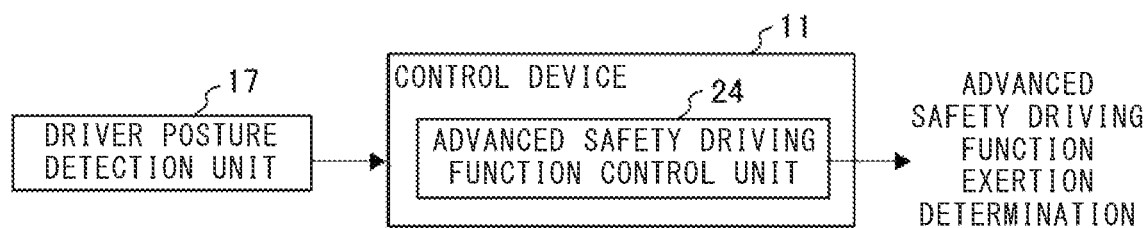
FIG. 18 is a function block diagram showing the configuration of the driver posture measurement device in a case of performing exertion determination for an advanced safety driving function of the vehicle according to the first embodiment.

In addition, whether or not an advanced safety driving function can be exerted is determined on the basis of the posture of the driver X detected by the driver posture detection unit 17. FIG. 18 is a function configuration diagram showing the configuration of the driver posture measurement device in a case of performing exertion determination for the advanced safety driving function of the vehicle. The control device 11 includes an advanced safety driving function control unit 24. The driver posture from the driver posture detection unit 17 is inputted thereto.

For example, during exertion of the advanced safety driving function, in a case where the driver X performs turning traveling from normal traveling, i.e., in a case where the posture of the driver X detected by the driver posture detection unit 17 changes from the normal riding posture to the lean-in posture, the advanced safety driving function control unit 24 cancels the advanced safety driving function. Then, in a case where the driver X returns from turning traveling to normal traveling, i.e., in a case where the posture of the driver X detected by the driver posture detection unit 17 changes from the lean-in posture to the normal riding posture, the advanced safety driving function control unit 24 exerts the advanced safety driving function again. Thus, exertion determination for the advanced safety driving function of the vehicle is performed.

In the driver posture measurement device according to the first embodiment as described above, the radio wave arrival angle and the radio wave intensity between the communication units are detected by one wireless communication unit attached to the driver's body and one wireless communication unit provided on the vehicle side, and the tilt of the vehicle is measured by the tilt angle sensor provided to the vehicle. With such a simple structure, various riding postures of the driver are determined, and on the basis of the determined riding posture, drive control for the motive power source and exertion determination for the advanced safety driving function can be instantaneously performed.

Second Embodiment

In the first embodiment, detection for the driver posture is performed using the detection results from the radio wave arrival angle detection unit 14, the radio wave intensity detection unit 15, and the vehicle tilt detection unit 16. In the present embodiment, the detection is performed using two detection results from the radio wave arrival angle detection unit 14 and the vehicle tilt detection unit 16.

Figure 19:
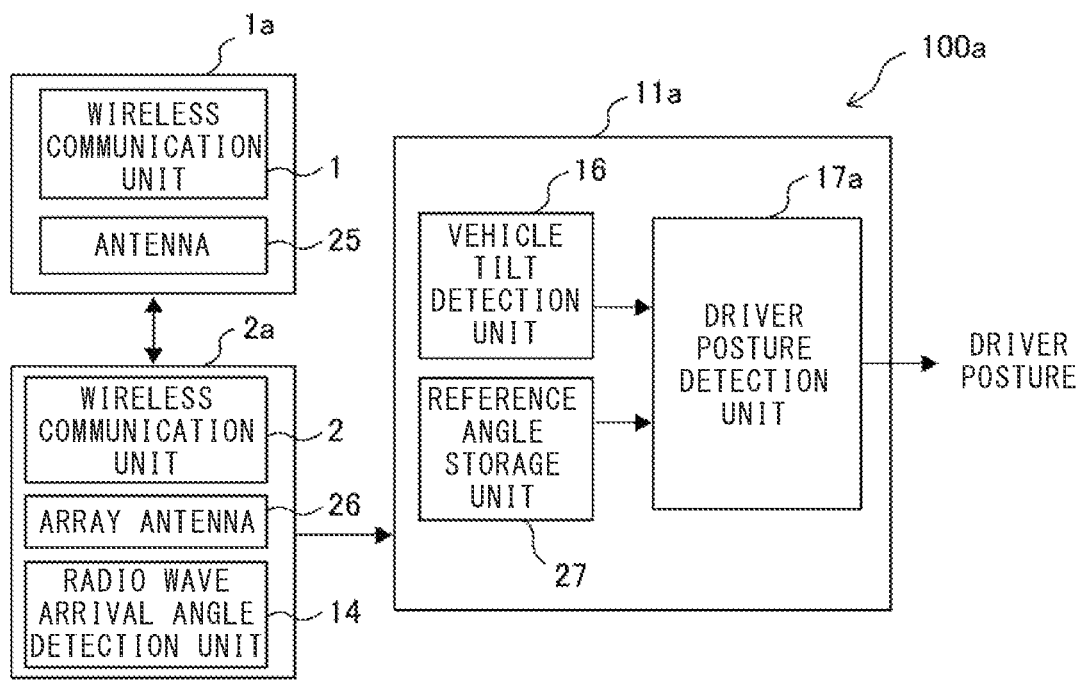
FIG. 19 is a function block diagram of a driver posture measurement device according to the second embodiment of the present disclosure.

FIG. 19 shows a function block diagram of a driver posture measurement device 100a. The driver posture measurement device 100a includes a driver-side wireless device 1a, a vehicle-side wireless device 2a, and a control device 11a, and the control device 11a includes the vehicle tilt detection unit 16, a driver posture detection unit 17a, and a reference angle storage unit 27.

The driver-side wireless device 1a includes an antenna 25 and the wireless communication unit 1. The antenna 25 and the wireless communication unit 1 are provided to the helmet worn by the driver X, at a position on a surface in the head up-down direction passing the head top and the forehead of the driver X, for example.

The vehicle-side wireless device 2a includes an array antenna 26 and the wireless communication unit 2. The array antenna 26 and the wireless communication unit 2 are provided inside the meter device 8. Basically, the array antenna 26 may be provided at any other position that allows viewing without obstacles in a space where the radio waves are propagated from the array antenna 26 to the antenna 25 during driving. The vehicle-side wireless device 2a includes the radio wave arrival angle detection unit 14.

When the wireless communication unit 1 has received a call signal from the wireless communication unit 2, the wireless communication unit 1 generates a signal for radio wave arrival angle measurement and outputs the signal to the antenna 25. The antenna 25 radiates a transmission signal as radio waves.

When the array antenna 26 has received the transmission signal from the antenna 25, the array antenna 26 outputs the received signal to the wireless communication unit 2. The vehicle-side wireless device 2a calculates the radio wave arrival angle from the received signal by the radio wave arrival angle detection unit 14. As the radio wave arrival angle, a radio wave arrival angle $\theta fr$ in the vehicle advancing direction and a radio wave arrival angle $\theta rl$ in the vehicle left-right direction are calculated using the attachment angle of the wireless communication unit 2 as a reference, and the calculated angles are outputted to the driver posture detection unit 17a in the control device 11a.

In FIG. 19, the radio wave arrival angle detection unit is provided in the vehicle-side wireless device 2a. However, as in the first embodiment, the radio wave arrival angle detection unit may be provided in the control device 11a.

The radio wave arrival angles $\theta fr$, $\theta rl$ are calculated using the frequency, the amplitude, and the phase of the received signal. Specifically, technology used in radar or the like may be applied, e.g., monopulse angle measurement, a MUSIC method, maximum likelihood estimation, or the like may be used. As the wireless communication unit 1 and the wireless communication unit 2, a device having a ranging function and an angle measurement function in addition to a communication function can be used, and specifically, a Bluetooth communication unit or a UWB communication unit may be used.

As described later, the driver posture detection unit 17a in the driver posture measurement device 100a calculates a deviation angle $\Delta\theta fr$ (see FIG. 21 and FIG. 22) of the radio wave arrival angle $\theta fr$ in the vehicle advancing direction, with respect to a reference angle $\theta fr0$ (see FIG. 20), and a deviation angle $\Delta\theta rl$ (see FIG. 24 to FIG. 27) of the radio wave arrival angle $\theta rl$ in the vehicle left-right direction, with respect to a reference angle $\theta rl0$ (see FIG. 23).

The reference angles $\theta fr0$ and $\theta rl0$ correspond to a reference position of the head with respect to the vehicle when the posture is in the normal riding state. The reference angles $\theta fr0$ and $\theta rl0$ are stored in the reference angle storage unit 27.

Figure 20:
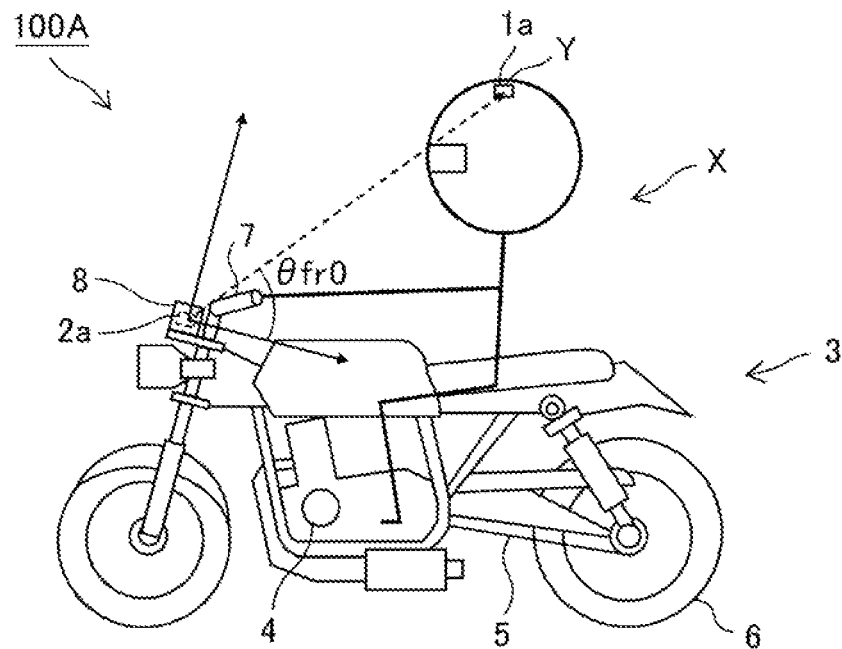
FIG. 20 is a left side view illustrating the riding posture of the driver according to the second embodiment.
Figure 21:
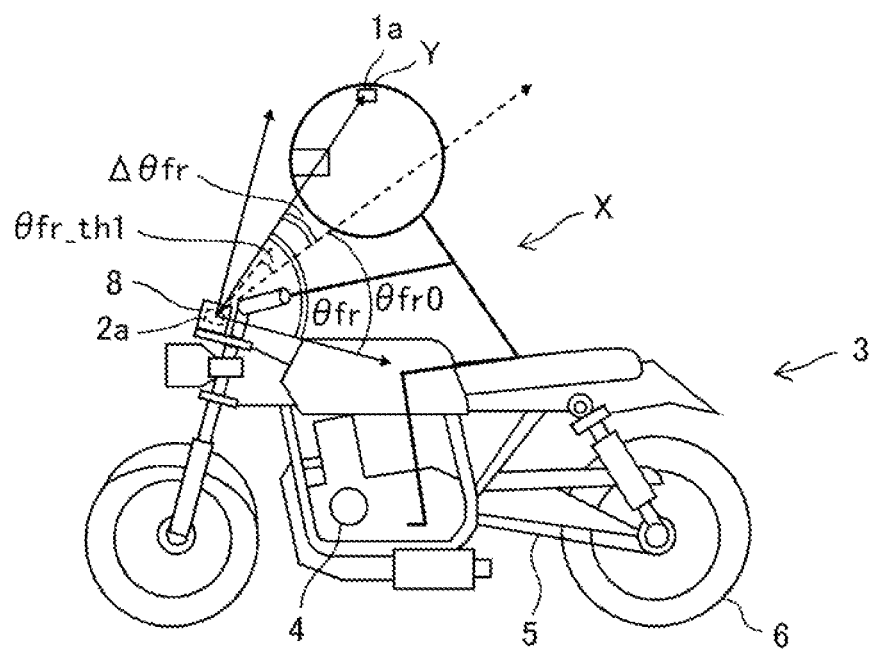
FIG. 21 is a left side view illustrating the riding posture of the driver according to the second embodiment.
Figure 22:
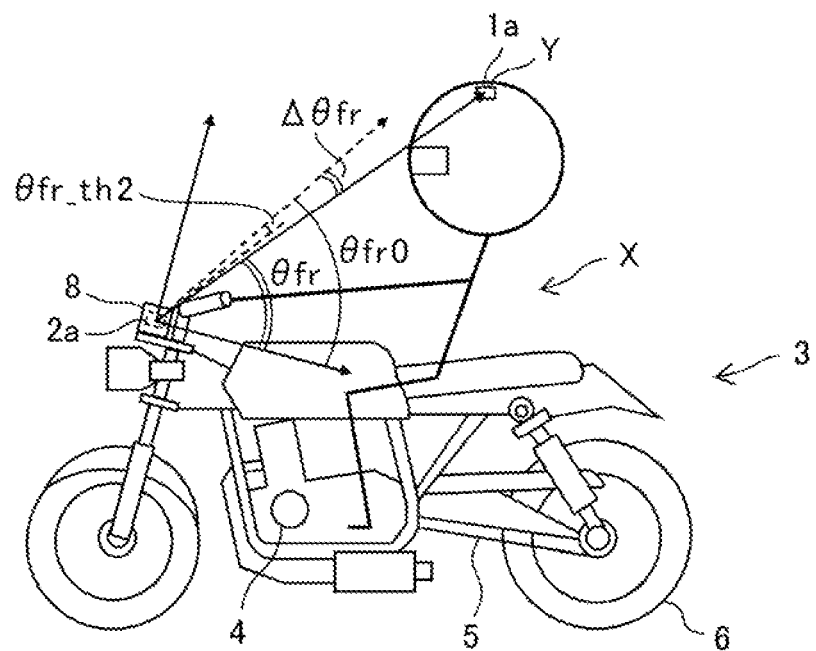
FIG. 22 is a left side view illustrating the riding posture of the driver according to the second embodiment.
Figure 23:
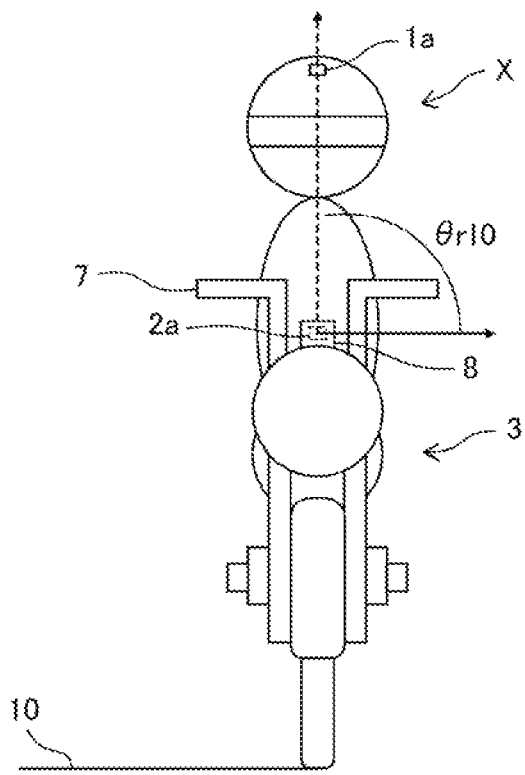
FIG. 23 is a front view illustrating the riding posture of the driver according to the second embodiment.

FIG. 20 to FIG. 22 illustrate the radio wave arrival angle $\theta fr$ and the deviation angle $\Delta\theta fr$ thereof with respect to the reference angle $\theta fr0$ in each of the normal riding posture, the forward-leaning posture, and the rearward-leaning posture. FIG. 23 to FIG. 27 illustrate the radio wave arrival angle $\theta rl$ and the deviation angle $\Delta\theta rl$ thereof with respect to the reference angle $\sigma rl0$. In the drawings, broken-line arrows indicate the radio wave arrival direction in the normal riding state.

The calculated deviation angle $\Delta\theta fr$, the calculated deviation angle $\Delta\theta rl$, and the vehicle tilt (vehicle roll angle to the ground) $\theta v$ detected by the vehicle tilt detection unit 16 are subjected to threshold determination, to perform forward-leaning determination, rearward-leaning determination, normal riding determination, hanging-off determination, lean-with determination, lean-in determination, and lean-out determination, and the determination result is outputted.

Figure 28:
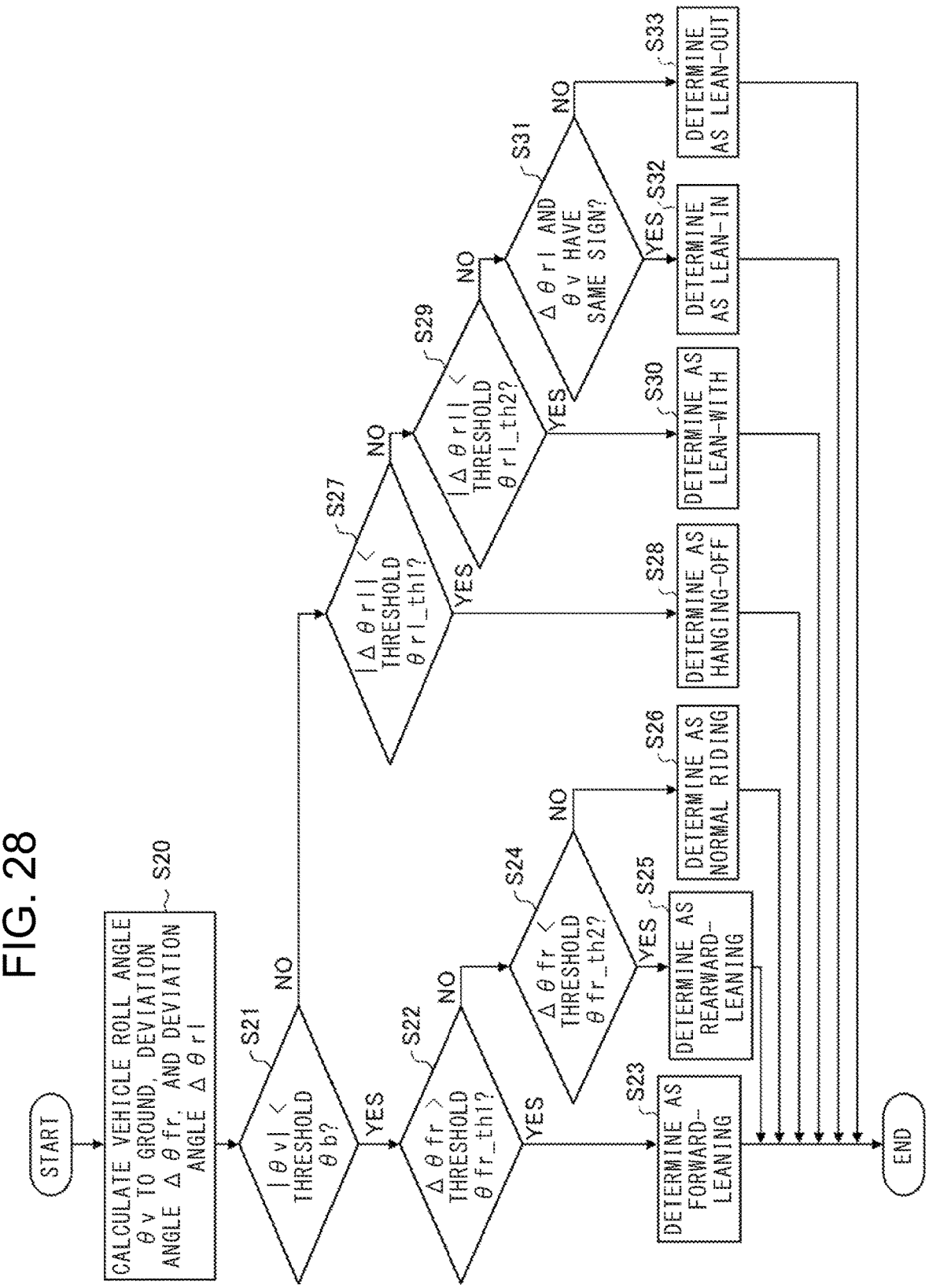
FIG. 28 is a flowchart illustrating operation for determining the vehicle posture according to the second embodiment.

FIG. 28 is a flowchart showing a procedure for driver posture measurement control. Hereinafter, description will be given along the flowchart with reference to FIG. 20 to FIG. 27. This control is performed in the driver posture detection unit 17a. In step S20, on the basis of output from the tilt angle sensor 13, the vehicle tilt (vehicle roll angle to the ground) $\theta v$ is detected by the vehicle tilt detection unit 16, and the deviation angle $\Delta\theta fr$ and the deviation angle $\Delta\theta rl$ are calculated.

In step S21, as in the first embodiment, the absolute value of the vehicle tilt (vehicle roll angle to the ground) $\theta v$ is subjected to determination using the threshold $\theta b$, to determine whether or not the vehicle is upright. If the determination result is YES in step S21, the process proceeds to step S22. In step S22, whether or not the deviation angle $\Delta\theta fr$ is greater than a threshold $\theta fr\_th1$ is determined (see FIG. 21). If the determination result is YES in step S22, the process proceeds to step S23, so that the posture is determined to be the forward-leaning posture.

If the determination result is NO in step S22, the process proceeds to step S24, to determine whether or not the deviation angle $\Delta\theta fr$ is smaller than a threshold $\theta fr\_th2$ (see FIG. 22). If the determination result is YES in step S24, the process proceeds to step S25, so that the posture is determined to be the rearward-leaning posture. If the determination result is NO in step S24, the process proceeds to step S26, so that the posture is determined to be the normal riding posture (see FIG. 20).

Figure 24:
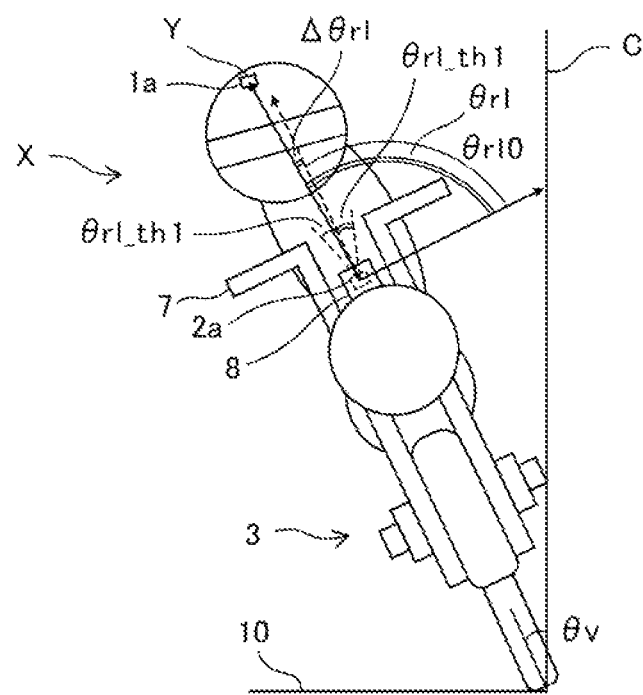
FIG. 24 is a front view illustrating the riding posture of the driver according to the second embodiment.

If the determination result is NO in step S21, the process proceeds to step S27, to determine whether or not the absolute value of the deviation angle $\Delta\theta rl$ is smaller than a threshold $\theta rl\_th1$ (see FIG. 24). If the determination result is YES in step S27, the process proceeds to step S28, so that the posture is determined to be the hanging-off posture.

Figure 25:
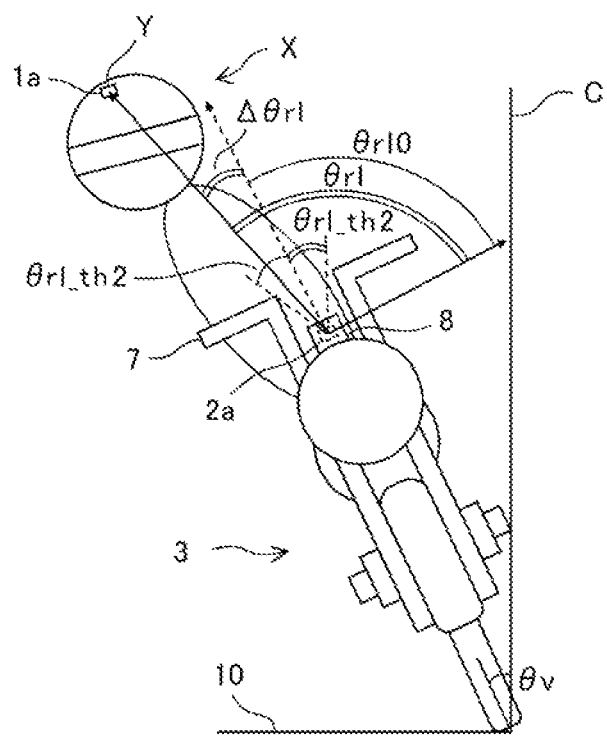
FIG. 25 is a front view illustrating the riding posture of the driver according to the second embodiment.
Figure 26:
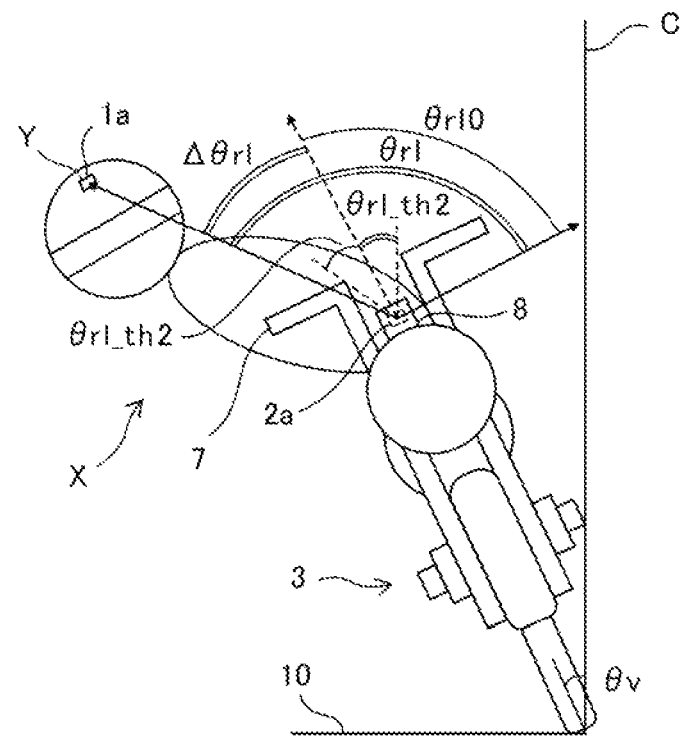
FIG. 26 is a front view illustrating the riding posture of the driver according to the second embodiment.
Figure 27:
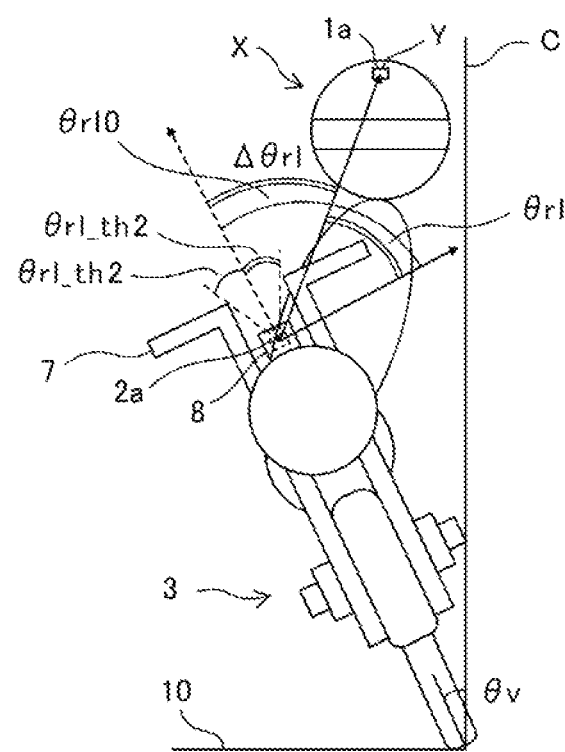
FIG. 27 is a front view illustrating the riding posture of the driver according to the second embodiment.

If the determination result is NO in step S27, the process proceeds to step S29, to determine whether or not the absolute value of the deviation angle $\Delta\theta rl$ is smaller than a threshold $\theta rl\_th2$ (see FIG. 25). If the determination result is YES in step S29, the process proceeds to step S30, so that the posture is determined to be the lean-with posture.

If the determination result is NO in step S29, the process proceeds to step S31, to determine whether or not the signs (positive/negative) of the deviation angle $\Delta\theta rl$ and the vehicle tilt (vehicle roll angle to the ground) $\theta v$ are the same. If the determination result is YES in step S31 (see FIG. 26), the process proceeds to step S32, so that the posture is determined to be the lean-in posture. If the determination result is NO in step S31 (see FIG. 27), the process proceeds to step S33, so that the posture is determined to be the lean-out posture.

Next, a method for setting the reference angle $\theta fr0$ and the reference angle $\sigma rl0$ to be stored in the reference angle storage unit 27 will be described.

With the driver X taking a posture in the normal riding state, the radio wave arrival angle measured at this time is set as the reference angle. As another method, the radio wave arrival angle measured immediately after the driver X starts vehicle traveling may be recorded a plurality of times, and the reference angle may be calculated through statistical analysis. For example, the average value or the median value of the plurality of recorded radio wave arrival angles may be used.

Further, in a case where, at the time of starting the motive power source of the vehicle, a state in which the tilt of the vehicle measured by the vehicle tilt detection unit 16 is not upright is detected even though the posture of the driver X detected by the driver posture detection unit 17 is upright, the reference position for a vehicle upright state may be corrected so that the vehicle becomes an upright state.

The second embodiment described above provides the following effects.

(1) The posture of the driver can be measured with a simpler configuration than in the conventional art.

(2) Measurement of the radio wave arrival angle between the wireless communication units can be made with a simpler device configuration than in a case of radio ranging, whereby the driving posture can be measured with high accuracy.

(3) Since radio wave propagation between one wireless communication unit provided on the driver side and one wireless communication unit provided on the vehicle side is used, the number of provided wireless communication units can be decreased, so that there can be advantage in terms of design or cost of the vehicle.

(4) It is possible to automatically set the reference angle for the reference angle storage unit while detecting start of vehicle traveling, and thus simple operation can be performed without a burden on the driver.

Third Embodiment

Figure 29:
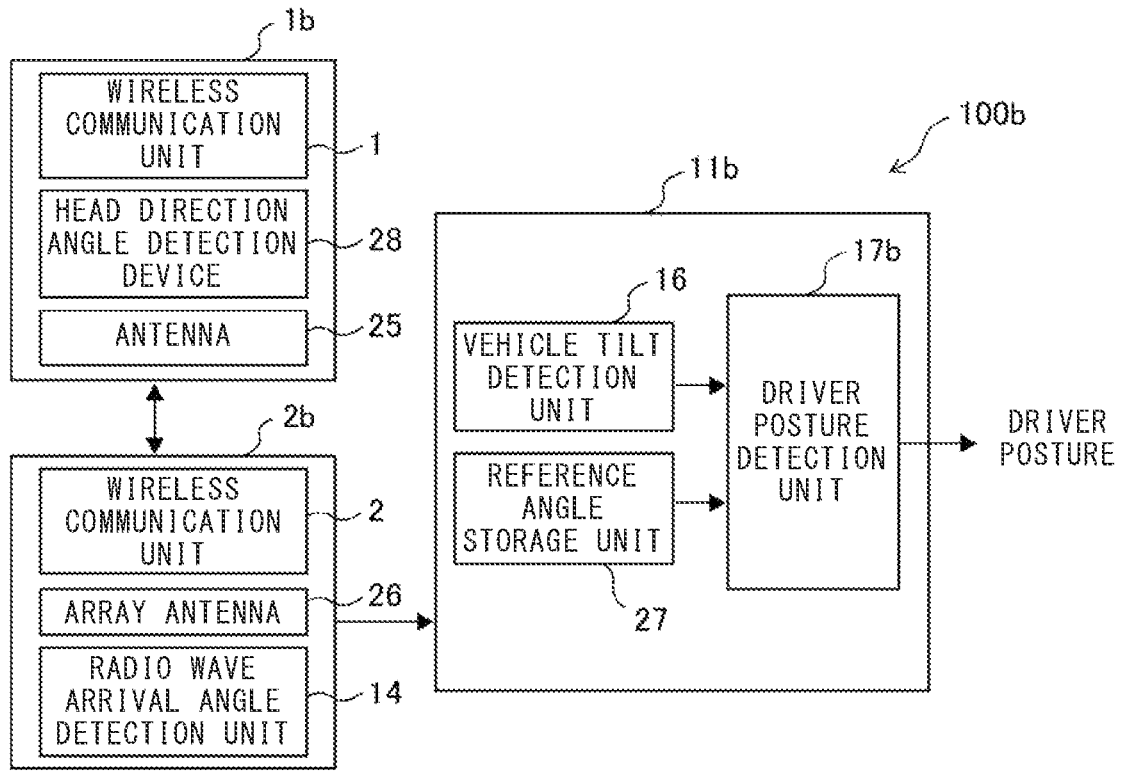
FIG. 29 is a function block diagram of a driver posture measurement device according to the third embodiment of the present disclosure.

FIG. 29 is a function block diagram of a driver posture measurement device 100*b*. Description of constituent parts having the same functions as those in the first or second embodiment is omitted.

A driver-side wireless device 1*b* of the driver posture measurement device 100*b* includes the antenna 25, the wireless communication unit 1, and a head direction angle detection device 28. The driver-side wireless device 1*b* is provided to the helmet worn by the driver X, at a position on a surface in the head up-down direction passing the head top and the forehead of the driver X, for example. The head direction angle detection device 28 detects the roll angle, the pitch angle, the yaw angle, and the like of the head by using the gyro sensor. In particular, a yaw angle φrl of the direction of the face of the driver X between left and right, is measured.

The vehicle-side wireless device 2*b* includes the array antenna 26 and the wireless communication unit 2. The array antenna 26 and the wireless communication unit 2 are provided inside the meter device 8. Basically, the array antenna 26 may be provided at any other position that allows viewing without obstacles in a space where the radio waves are propagated from the array antenna 26 to the antenna 25 during driving. The vehicle-side wireless device 2*b* includes the radio wave arrival angle detection unit 14.

When the wireless communication unit 1 has received a call signal from the wireless communication unit 2, the wireless communication unit 1 generates a signal for radio wave arrival angle measurement, and a signal indicating the yaw angle φrl of the direction of the face of the driver X between left and right measured by the head direction angle detection device, and outputs these signals from the antenna 25. The antenna 25 radiates a transmission signal as radio waves.

When the array antenna 26 has received the transmission signal, the array antenna 26 outputs the received signal to the wireless communication unit 2. The vehicle-side wireless device 2*b* calculates the radio wave arrival angle from the received signal by the radio wave arrival angle detection unit 14. As the radio wave arrival angle, the radio wave arrival angle θfr in the vehicle advancing direction and the radio wave arrival angle θrl in the vehicle left-right direction are calculated, and then outputted to a driver posture detection unit 17*b* in the control device 11*b*. In FIG. 29, the radio wave arrival angle detection unit is provided in the vehicle-side wireless device 2*b*. However, as in the first embodiment, the radio wave arrival angle detection unit may be provided in the control device. In addition, from the received signal, the yaw angle φrl of the direction of the face of the driver X between left and right is outputted to the driver posture detection unit 17*b*.

The driver posture detection unit 17*b* corrects the radio wave arrival angles θfr, θrl by the yaw angle φrl of the direction of the face between left and right, thus calculating corrected radio wave arrival angles θfr' and θrl'. For example, if the absolute value of φrl is greater than a predetermined threshold φrl_th, the radio wave arrival angles θfr and θrl are corrected by a predetermined correction angle in such a direction as to cancel out the direction of the face between left and right.

Using the corrected radio wave arrival angle θfr' and the corrected radio wave arrival angle θrl', the deviation angle Δθfr of the radio wave arrival angle in the vehicle advancing direction and the deviation angle Δθrl of the radio wave arrival angle in the vehicle left-right direction with respect to the radio wave arrival angle θfr0 in the vehicle advancing direction and the radio wave arrival angle σrl0 in the vehicle left-right direction which are the reference angles set in advance in the reference angle storage unit 27, are calculated.

Next, the calculated deviation angle Δθfr and deviation angle Δθrl are subjected to threshold determination, to calculate the position of the head of the driver X with respect to the vehicle. Then, by referring to a predetermined table together with the calculated position of the head and the vehicle tilt angle detected by the vehicle tilt detection unit 16, normal riding determination, hanging-off determination, lean-out determination, lean-in determination, and lean-with determination are performed in the same manner as described above, and the determination result is outputted.

In the present embodiment, correction is performed with the angle of the direction of the face between left and right, whereby accuracy of driver posture measurement is further improved, in addition to the effects described in the second embodiment.

Fourth Embodiment

Figure 30:
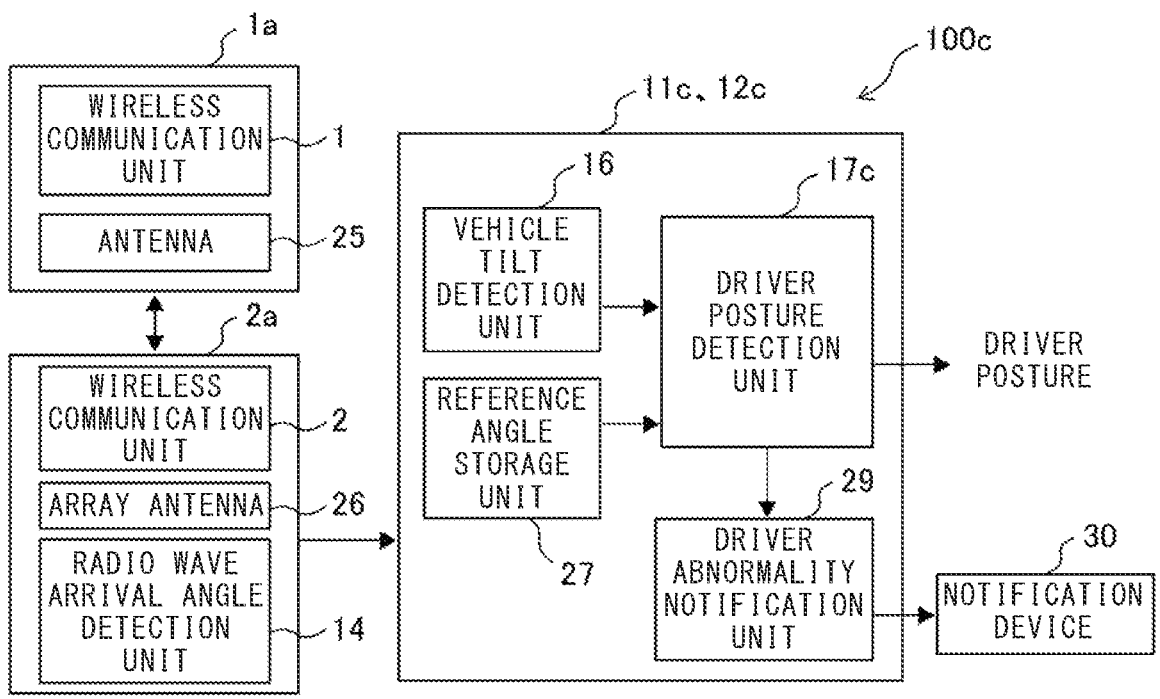
FIG. 30 is a function block diagram of a driver posture measurement device according to the fourth embodiment of the present disclosure.

FIG. 30 shows a function block diagram of a driver posture measurement device 100*c*. Description of constituent parts having the same functions as those in the first or second embodiment is omitted. The driver posture measurement device 100*c* includes the driver-side wireless device 1*a*, the vehicle-side wireless device 2*a*, a control device 11*c*, an ECU 12*c*, and a notification device 30. The control device 11*c* or the ECU 12*c* includes a driver posture detection unit 17*c*, a driver abnormality notification unit 29, and the reference angle storage unit 27.

The ECU 12*c* for controlling an output to the notification device 30 includes the driver abnormality notification unit 29. The driver posture detection unit 17*c* receives an output from the radio wave arrival angle detection unit 14 and an output from the vehicle tilt detection unit 16 shown in FIG. 3. The driver abnormality notification unit 29 determines whether or not abnormality has occurred in the driver X, on the basis of the driver posture, the deviation angle Δθrl, and the vehicle tilt (vehicle roll angle to the ground) θv from the driver posture detection unit 17*c*. When abnormality has occurred in the driver X, a driver abnormality signal is outputted to the notification device 30.

The driver abnormality notification unit 29 causes a display screen as the notification device 30 provided on the meter device 8 to display information about the result of driver abnormality determination. If it is detected that the driver posture repeatedly becomes the forward-leaning posture, the rearward-leaning posture, or the standing posture at a predetermined cycle and such a posture variation has continued over a predetermined time, it is determined that the driver X feels tired, and thus the driver X is determined to be abnormal.

In addition, regarding the vehicle roll angle to the ground and the radio wave arrival angle $\theta$rl in the vehicle left-right direction, if a time during which the driver X is tilted to the left or the right beyond a predetermined radio wave arrival angle has continued over a predetermined time even though the vehicle body is upright, it is determined that the driver X is in a bad condition, and thus the driver X is determined to be abnormal.

Figure 31:
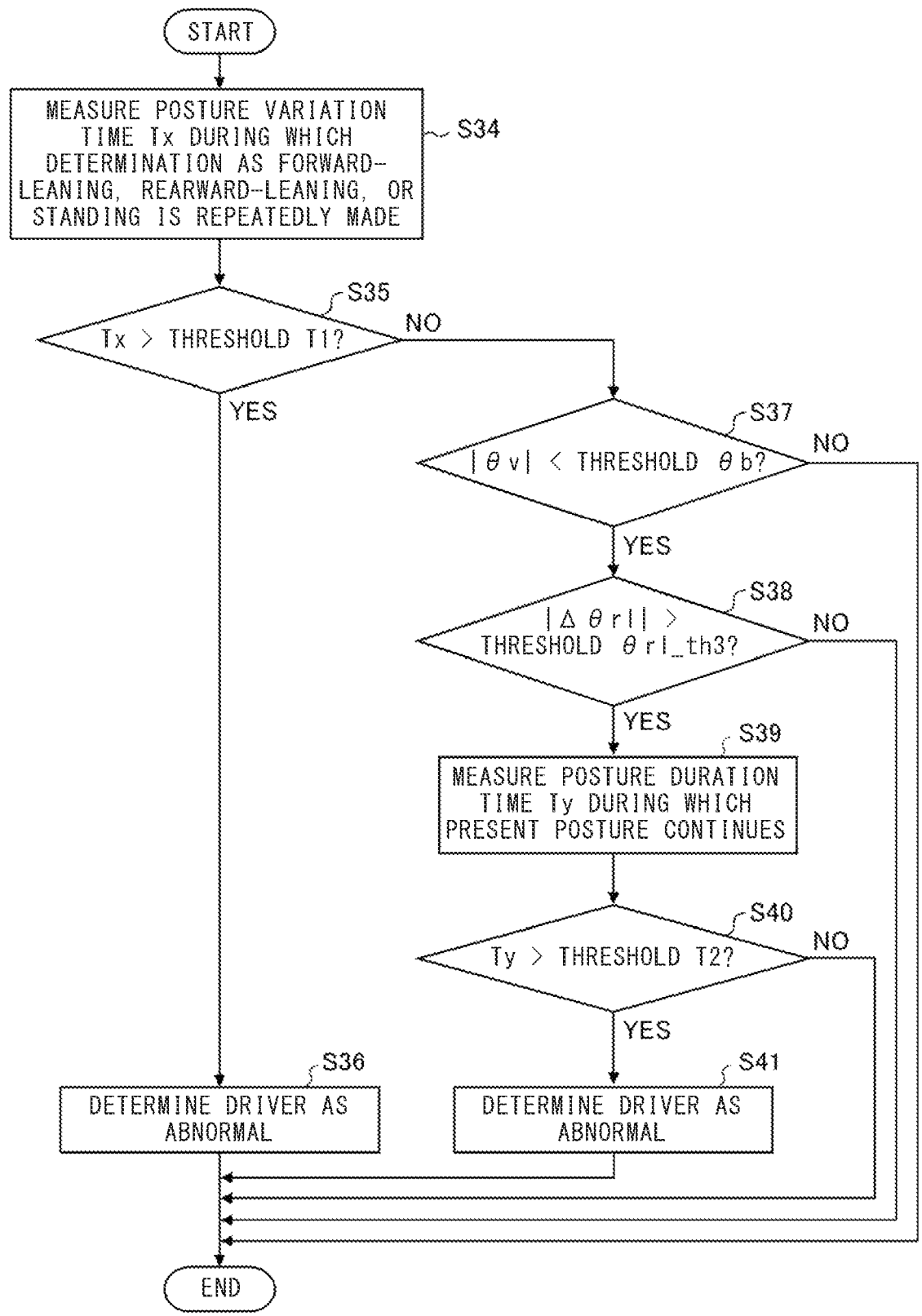
FIG. 31 is a flowchart showing a process of driver abnormality determination control according to the fourth embodiment.

FIG. 31 is a flowchart showing a procedure of driver abnormality determination control. This control is performed in the driver abnormality notification unit 29. In step S34, a posture variation time Tx during which the forward-leaning posture, the rearward-leaning posture, or the standing posture is repeatedly taken, is measured. In step S35, whether or not the posture variation time Tx is greater than a threshold T1 is determined. If the determination result is YES in step S35, the process proceeds to step S36, so that the driver is determined to be abnormal.

If the determination result is NO in step S35, the process proceeds to step S37. In step S37, the absolute value of the vehicle tilt (vehicle roll angle to the ground) $\theta$v is subjected to determination using the threshold $\theta$b, to determine whether or not the vehicle is upright. If the determination result is YES in step S37, the process proceeds to step S38, to determine whether or not the absolute value of the deviation angle $\Delta\theta$rl is greater than a threshold $\theta$rl_th3.

If the determination result is YES in step S38, the process proceeds to step S39. In step S39, a posture duration time Ty of the posture determined in step S38 is measured. In step S40, whether or not the posture duration time Ty is greater than a threshold T2 is determined. If the determination result is YES in step S40, the process proceeds to step S41, so that the driver is determined to be abnormal.

In the present embodiment, with the driver posture measurement device having a simpler configuration than in the conventional art, variation in the driver posture is detected, whereby abnormality of the driver can be determined and notified.

It is noted that the type of the motorcycle, the structures or the types of the wireless communication units, the provided positions of the wireless communication units, the determination thresholds, the type of the helmet, and the like are not limited to those shown in the above first to fourth embodiments, and may be changed as appropriate. The driver posture measurement device according to the present disclosure is not limited to application to a motorcycle, and is applicable to various types of vehicles such as three/four-wheeled vehicles of a saddle-type.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 wireless communication unit
1a, 1b driver-side wireless device
2 wireless communication unit
2a, 2b vehicle-side wireless device
3 vehicle
4 engine
5 drive chain
6 rear wheel
7 steering handlebar
8 meter device
9 gyro sensor
10 road surface
11, 11a, 11b, 11c control device
12, 12c ECU
13 tilt angle sensor
14 radio wave arrival angle detection unit
15 radio wave intensity detection unit
16 vehicle tilt detection unit
17, 17a, 17b, 17c driver posture detection unit
18 drive output control unit
19 fuel injection control unit
20 ignition timing control unit
21 electronically-controlled throttle control unit
22 motor
23 inverter control unit
24 advanced safety driving function control unit
25 antenna
26 array antenna
27 reference angle storage unit
28 head direction angle detection device
29 driver abnormality notification unit
30 notification device
100, 100a, 100b, 100c driver posture measurement device

What is claimed is:

1. A driver posture measurement device comprising:
   one first wireless communicator attached directly or indirectly to a head of a driver;
   one second wireless communicator provided to a vehicle;
   a radio wave arrival angle detector which detects, for the second wireless communicator, a radio wave arrival angle from the first wireless communicator; and
   a driver posture detector which determines a driving posture of the driver on the basis of the radio wave arrival angle.

2. The driver posture measurement device according to claim 1, wherein
   a first radio wave arrival angle in an advancing direction of the vehicle and a second radio wave arrival angle in a left-right direction of the vehicle are detected by the radio wave arrival angle detector, and
   frontward/rearward movement of the driver is detected on the basis of the first radio wave arrival angle and leftward/rightward movement of the driver is detected on the basis of the second radio wave arrival angle, by the driver posture detector.

3. The driver posture measurement device according to claim 1, further comprising a radio wave intensity detector which detects an intensity of radio waves from the first wireless communicator received by the second wireless communicator, wherein
leftward/rightward movement of the driver is detected by the radio wave arrival angle detector, and frontward/rearward movement of the driver is detected by the radio wave intensity detector.

4. The driver posture measurement device according to claim 1, further comprising a vehicle tilt detector which is provided to the vehicle and detects a tilt of the vehicle, wherein
on the basis of an output of the vehicle tilt detector and an output of the radio wave arrival angle detector, the driving posture of the driver is detected by the driver posture detector.

5. The driver posture measurement device according to claim 4, wherein
in a case where, at a time of starting the vehicle, a state in which the tilt of the vehicle measured by the vehicle tilt detector is not upright is detected even though the posture of the driver detected by the driver posture detector is upright, a reference position for a vehicle upright state is correctable so that the vehicle becomes an upright state.

6. The driver posture measurement device according to claim 1, wherein
the driver posture detector detects a posture type of the driver by comparing the radio wave arrival angle with a plurality of predetermined reference values.

7. The driver posture measurement device according to claim 1, further comprising:
a gyro sensor attached directly or indirectly to the driver; and
a head direction angle detector which detects a direction of a head of the driver detected by the gyro sensor, wherein
the radio wave arrival angle is corrected by an output of the head direction angle detector.

8. The driver posture measurement device according to claim 1, further comprising a reference angle setter which sets a reference radio wave arrival angle on the basis of a radio wave arrival angle measured immediately after the driver starts traveling.

9. The driver posture measurement device according to claim 1, further comprising a driver abnormality notification circuitry which detects an abnormal state of the driver on the basis of the posture of the driver detected by the driver posture detector.

10. A vehicle control device comprising:
the driver posture measurement device according to claim 1; and
a drive output controller which controls a drive output of a motive power source of the vehicle on the basis of an output of the driver posture detector of the driver posture measurement device.

11. The vehicle control device according to claim 10, wherein
the motive power source is an internal combustion engine.

12. The vehicle control device according to claim 11, wherein
the drive output controller adjusts at least one of a fuel injection amount of the internal combustion engine, a fuel injection timing thereof, a fuel ignition timing thereof, and an intake air amount to the internal combustion engine.

13. The vehicle control device according to claim 10, wherein
the motive power source is a motor.

14. The vehicle control device according to claim 13, wherein
the drive output controller controls output torque of the motor.

15. The vehicle control device according to claim 10, further comprising an advanced safety driving function controller which controls information about whether or not to allow exertion of an advanced safety driving function, on the basis of the posture of the driver detected by the driver posture detector.

* * * * *